(12) United States Patent
Lazzer

(10) Patent No.: US 8,820,223 B2
(45) Date of Patent: Sep. 2, 2014

(54) TOASTER

(75) Inventor: Jean-Pierre Lazzer, Montchanín (FR)

(73) Assignee: Hameur S.A., Luxembourg (LU)

( * ) Notice: Subject to any disclaimer, the term of this patent is extended or adjusted under 35 U.S.C. 154(b) by 472 days.

(21) Appl. No.: 13/202,901

(22) PCT Filed: Feb. 19, 2010

(86) PCT No.: PCT/FR2010/050283
§ 371 (c)(1),
(2), (4) Date: Aug. 23, 2011

(87) PCT Pub. No.: WO2010/094895
PCT Pub. Date: Aug. 26, 2010

(65) Prior Publication Data
US 2011/0303099 A1    Dec. 15, 2011

(30) Foreign Application Priority Data
Feb. 23, 2009    (FR) ...................................... 09 51142

(51) Int. Cl.
*A47J 37/08*    (2006.01)
*A47J 37/06*    (2006.01)

(52) U.S. Cl.
CPC .......... *A47J 37/0807* (2013.01); *A47J 37/0635* (2013.01)
USPC ................................ 99/401; 99/385; 99/389

(58) Field of Classification Search
CPC .............. A47J 37/0814; A47J 37/0807; A47J 37/0857; A47J 37/0688
USPC .......... 99/386, 385, 389, 390, 391, 393, 401; 219/521, 520
See application file for complete search history.

(56) References Cited

U.S. PATENT DOCUMENTS

| | | | |
|---|---|---|---|
| 2,631,523 A * | 3/1953 | Olving | 99/326 |
| 4,761,529 A | 8/1988 | Tsisios | |
| 5,400,697 A * | 3/1995 | Dax et al. | 99/389 |
| 5,471,914 A * | 12/1995 | Krasznai et al. | 99/389 |
| 5,960,702 A * | 10/1999 | Thiriat et al. | 99/327 |
| 6,125,234 A * | 9/2000 | de Jenlis | 392/439 |
| 6,584,889 B2 * | 7/2003 | Friel, Sr. | 99/327 |
| 6,639,187 B2 * | 10/2003 | Arel et al. | 219/388 |
| 6,657,168 B1 | 12/2003 | Lazzer | |
| 2001/0016222 A1 * | 8/2001 | Tomsich et al. | 426/523 |

FOREIGN PATENT DOCUMENTS

| | | |
|---|---|---|
| DE | 19652270 | 3/1998 |
| FR | 2799632 | 4/2001 |
| GB | 1270859 | 4/1972 |

* cited by examiner

*Primary Examiner* — Reginald L Alexander
(74) *Attorney, Agent, or Firm* — IM IP Law PLLC; C. Andrew Im

(57) ABSTRACT

The invention relates to a toaster. The toaster comprises a thermally insulating box, a mobile housing to receive a slice or piece of bread, and at least one heat element. Each one of the side walls of the thermally insulating box comprises two transparent plates and a space being provided between the two plates to form a wall. The heating element utilizes infrared radiation and is equipped with at least one means for preventing a portion of the radiation from diffusing towards the bread.

19 Claims, 2 Drawing Sheets

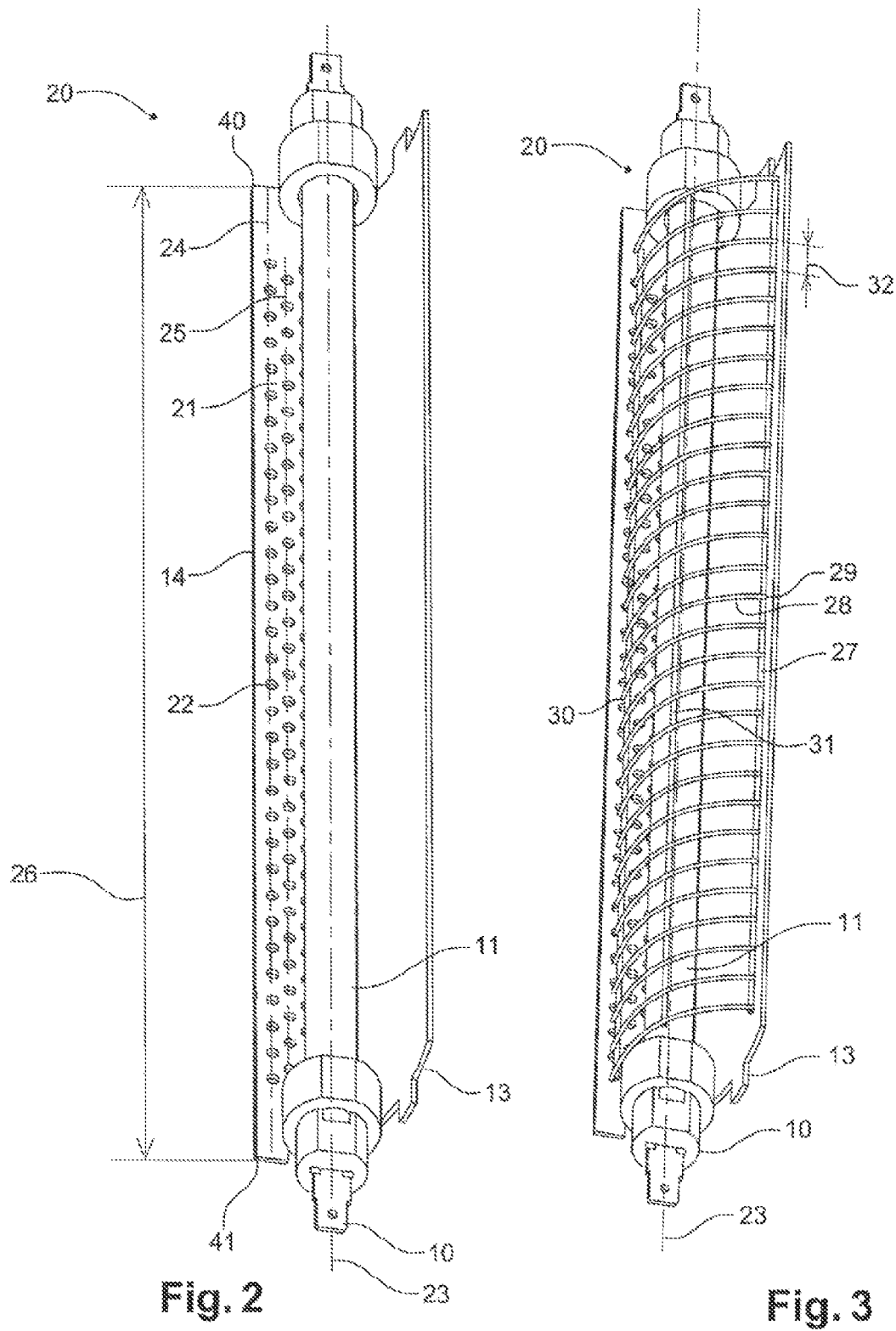

TOASTER

RELATED APPLICATIONS

This application is a §371 application from PCT/FR2010/050283 filed Feb. 19, 2010, which claims priority from French Patent Application No. 09 51142 filed Feb. 23, 2009, each of which is herein incorporated by reference in its entirety.

TECHNICAL FIELD OF INVENTION

The present invention refers to a household device such as a toaster.

BACKGROUND OF THE INVENTION

This wide-spread kind of device generally comprises a thermally insulating box forming the body of the device. This box contains at least one heating element, for example one or more resistors connected to a source of electric voltage. The box also contains a mobile housing in which a piece of bread to be toasted is placed, said housing being located near the resistors. The resistors are heated during a given time, after which the piece of toast is ejected from the device.

It is in particular known to include the resistors in tubes of quartz, in order to prevent the user from coming into contact with a naked conductor.

A toasting level of the bread is chosen by the user, classically by means of a cursor or of a serrated roller, before introducing the bread into the device. However, said cursor or said serrated roller is generally connected to means for determining the toasting duration. This duration, often approximate, does not correspond to a precise toasting quality for the bread. Indeed, for the same toasting duration, the result obtained in terms of visual aspect and taste varies according to the nature of the bread introduced. Variation factors are in particular the thickness of the bread slice and its percentage of moisture.

It is thus useful to be able to control visually the toasting progression for the bread, in order to stop it when it reaches the level desired by the user. A solution to this problem is provided by the invention described in the patent FR 2 799 632, in the name of the Applicant. This invention relates to a toaster whose side walls of the box are transparent. Thus, the bread slices introduced into the device can be seen during their toasting which can thus be stopped at the desired time.

According to a variant of the invention described in the patent FR 2 799 632, the heating elements are arranged in the upper and lower parts of the box, in order to clear the median part of said box. In this manner, the heating elements are not very visible by the user. He can thus control the toasting level for a piece of bread without its field of vision being obstructed by the presence of a heating element.

A disadvantage of positioning the heating elements outside the median part of the box is related to the toasting quality for the bread. Indeed, a bread slice introduced into such a device is more toasted near the heating elements, that is to say at the top and at the bottom, than in its median part. One thus obtains a not very homogeneous toasting, which is unsatisfactory for the consumer.

A known solution, described in the patent FR 2 799 632 consists in including the heating elements into reflector housings. These reflector housings have a generally bent shape, able to reflect a part of the infrared radiation of the resistors towards the bread slices, in particular towards their median part. These reflectors thus enable to homogenize the toasting of the bread if the heating elements are placed at the top and at the bottom of the box.

However, it happens that the result obtained is not sufficiently homogeneous for the taste of the consumer. There is thus a need to control the toasting level according to the zone of the bread slice.

Another disadvantage related to the position of the heating elements relates to the bread crumbs falling to the bottom of the device. Indeed, when introducing or ejecting the bread, crumbs can fall onto the heating elements and, if necessary, onto the reflectors. The heating elements concerned are mainly those being in a lower part of the box.

Because of their shape, in particular curved, the reflectors which receive bread crumbs keep these crumbs in the vicinity of, even in contact with, the heating elements. During toasting, these crumbs are brought up to a very high temperature. They calcine and give off smoke, which causes an embarrassment for the consumer and a risk of starting a fire.

Moreover, this calcination leaves unaesthetic traces on the heating elements and the reflectors. If the box is transparent, the interior of the device can be seen by the user. It is thus preferable to avoid the appearance of such traces of calcinations on the reflectors.

OBJECT AND SUMMARY OF THE INVENTION

The present invention enables to solve these various problems. The invention refers to a toaster comprising a thermally insulating box, a mobile housing intended to receive a piece of bread, at least one infrared radiation heating element; said toaster being characterized in that at least one heating element is equipped with at least one means for preventing a part of the radiation from diffusing towards the bread.

According to an embodiment of the invention, at least one radiation heating element comprises a reflector housing, said reflector housing enabling to reflect a part of the radiation towards the bread to be toasted, and a part of a surface of said reflectors is equipped with means for preventing the radiation from being reflected towards the bread. According to this embodiment of the invention, the radiation is partially prevented from diffusing by reflection towards the bread.

The means for preventing the radiation from being reflected can consist of a non-reflective material, applied to a part of the surface of the reflector. This material can in particular be a varnish or paint. These means can also consist of another treatment of the surface of the reflector, such as a grinding or a local deformation.

According to a preferential embodiment of the invention, the means for preventing the radiation from being reflected are through holes, provided in the surface of the reflectors.

According to another embodiment of the invention, at least one radiation heating element comprises a wall arranged between the heating element and the mobile housing. Said wall absorbs a part of the radiation diffused towards the bread. Thus, the direct radiation is partially prevented from diffusing towards the bread.

According to a preferential embodiment of the invention, the wall comprises a surface having at least one absorbance gradient for the infrared radiation. Thus, according to the zone of the wall considered, the absorbance is different. The intensity of the infrared radiation diffused towards the bread is thus modulated according to the zone of the piece to be toasted.

Such an absorbance gradient can be obtained by a variable thickness of the wall. The wall can also be made of several materials having different absorbances.

According to a preferential embodiment of the invention, the wall is made of a material which is transparent or translucent for the visible light. In particular a wall made of mica can be used. According to another embodiment, the wall is made of a material which is opaque for the visible light, such as for example PTFE (polytetrafluoroethylene).

According to an embodiment of the invention, the wall has one or more continuous surfaces. In order not to lengthen in a too important way the durations necessary to toast the bread, it is preferable to use a wall made of a material enable the passage of a sufficient part of the infrared radiation.

According to another embodiment of the invention, said wall comprises one or more perforations, in order to modulate the intensity of the infrared radiation received by one part of the piece of bread to be toasted or other.

According to a preferential embodiment of the invention, said wall is a grid. Such a grid is formed for example of metal wires. The provision of said wires enables to modulate the intensity of the infrared radiation received by one part of the piece of bread to be toasted or other.

In addition to its function of regulation of the infrared radiation diffused towards the bread, such a wall enables to prevent bread crumbs from being in contact with the heating element. If the heating element is equipped with a reflector, this wall can also prevent bread crumbs from accumulating onto the reflectors, in the vicinity of, or in contact with, the heating element. This function of protection against crumbs particularly relates to the heating elements which are in a lower part of the toaster.

It is known to equip the heating elements of grill ovens with such walls. However, these walls then have a function of mechanical protection against shocks, during the introduction of hard objects, such as dishes, inside the oven. These walls also have a function of protecting the user against a possible electrical contact in the event of a rupture of the heating element.

This function is useless in a toaster. Indeed, it is not intended for the introduction of hard objects or of the hand of a user.

The invention is of particular interest for toasters whose heating elements are positioned at the top and at the bottom of the device, in particular when the walls of said toaster are transparent.

However, the invention can be applied to any type of toaster, whatever the position of the heating elements. Generally, the invention enables to control the radiation of the heating elements towards a certain part of the bread to be toasted. Such an invention in particular enables to adopt an asymmetrical arrangement of the heating elements, for example by gathering them in an upper part of the device, while ensuring a homogeneous toasting of a bread slice.

BRIEF DESCRIPTION OF THE DRAWINGS

The invention will be better understood from the reading of the following description and the examination of the annexed figures. Those are given as an indication and by no means a limitation of the invention.

FIG. 2: a cavalier projection of a heating element and a reflector according to an embodiment of the invention;

FIG. 3: a cavalier projection of a heating element and a reflector according to another embodiment of the invention.

DETAILED DESCRIPTION OF THE EMBODIMENTS

Figure 1:
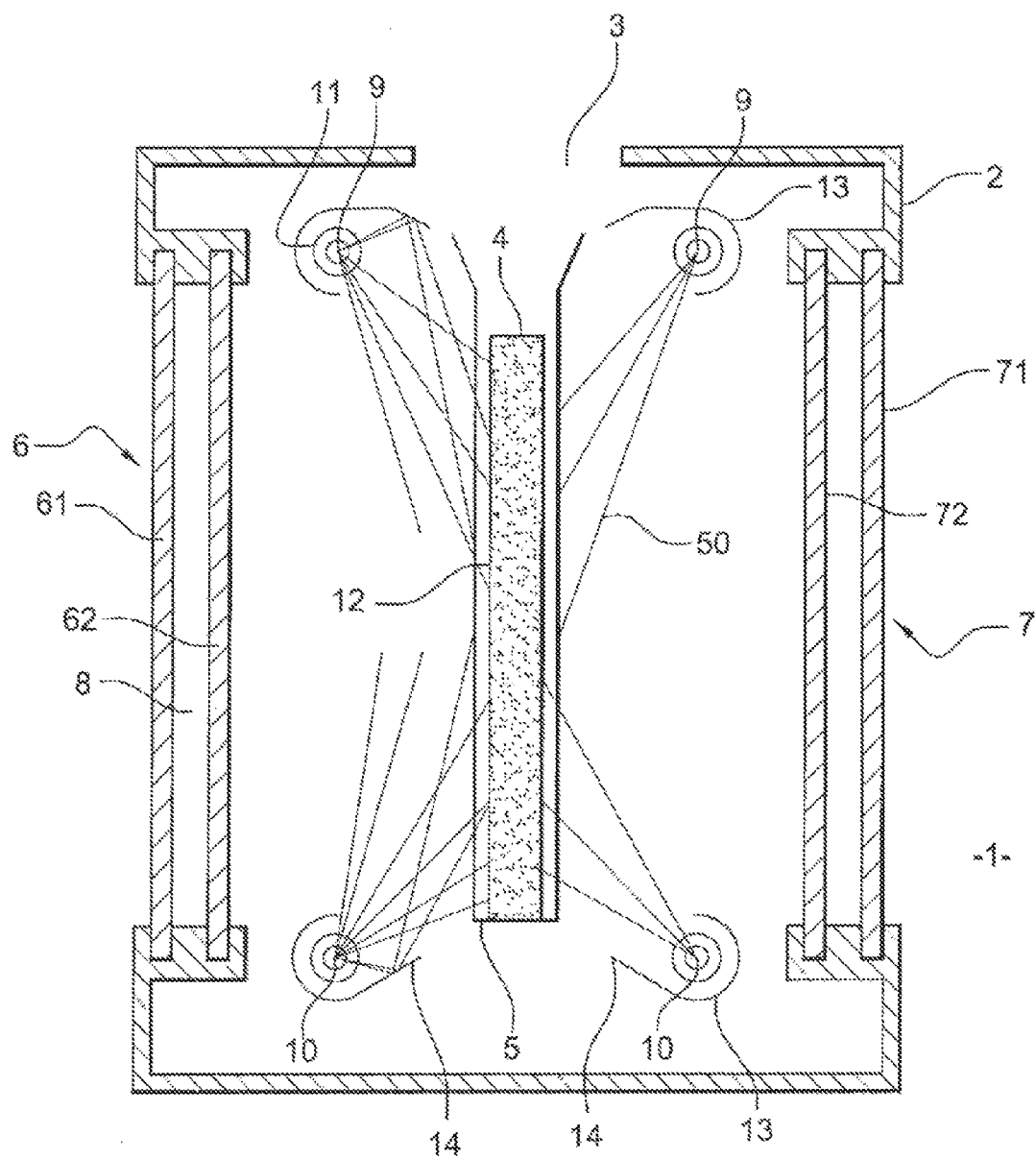
FIG. 1: a sectional view of a toaster according to an embodiment of the invention.

FIG. 1 represents a sectional view of a toaster according to an embodiment of the invention.

The toaster 1 comprises a thermally insulating box 2, having a substantially parallelepipedic shape. Said box is provided, in its upper part, with a slit 3 through which one or more slices of bread 4 can be introduced. A slice of bread 4 introduced into the toaster 1 is supported by a mobile housing 5, which can be translated vertically. Such a mobile housing 5 is used in a traditional way in the majority of the known toasters. In FIG. 1, the housing 5 is represented in a low position. The housing 5 is in particular in this low position during the operation of the heating elements (9, 10) of the toaster 1. When ejecting the bread, the housing 5 moves to a higher position.

The mobile housing 5 consists for example of metal wires spaced from each other, in order not to make obstacle with the bread toasting. In a preferential way, the mobile housing 5 comprises vertical wires arranged side by side. In a more preferential way, two adjacent wires are spaced with a maximal distance of 19 mm.

The housing 5 is in a median position in the box, relative to the side walls (6, 7). In the example in FIG. 1, the walls (6, 7) are transparent. More precisely, the walls (6, 7) are transparent for the visible light. Each one of these walls are composed of two transparent plates (61, 62; 71, 72), for example glass plates. A space 8, provided between both plates forming a wall, forms heat insulation between the inside and the outside of the box 2. In a preferential way, two transparent plates (61, 62) forming a wall are spaced with a distance of at least 2 mm.

According to the embodiment represented in FIG. 1, the walls (6, 7) are fixedly assembled on the box 2. According to another embodiment of the invention, at least one wall 6 or 7 is mobile in rotation relative to the box 2, for example relative to an axis perpendicular to the sectional plane in FIG. 1. Said mobile wall then forms a gate which enables to easily reach the inside of the box, for example for cleaning operations.

According to another embodiment of the invention, at least one wall 6 or 7 is assembled in a removable way relative to the box 2. More particularly, at least one wall 6 or 7 is fixed to the box 2 by means of a reversible assembly, for example clips.

Preferentially, if a wall (6, 7) is mobile in rotation or removable relative to the box 2, the toaster 1 is equipped with a safety system. This system switches off the power supply of the toaster when at least one of the walls (6, 7) is not in a closed position.

On each side of the mobile housing 5 are arranged heating elements 20, comprising for example heating resistors (9, 10). More precisely, each side of the mobile housing 5 comprises two heating resistors (9, 10). Advantageously, the resistors (9, 10) are included in tubes 11 of quartz, which improves the infrared radiation.

In order not to enter the field of vision of a user, the resistors 9 are located in the upper part of the box 2, while the resistors 10 are located in the lower part of the box 2. Thus, an observer located at the height of the transparent walls (6, 7) can clearly see the bread slices 4. He can thus evaluate in an optimal way the toasting level of said slices 4.

The positioning of the resistors (9, 10) at the top and at the bottom of the box tends to generate a greater toasting level in the upper and lower parts of the bread slice 4 than in the median part of said slice. In order to standardize the quantity of infrared radiations received by all the surface of the bread, it is provided around each tube 11 of quartz a reflector 13, which directs the infrared radiation 50 towards the bread, in particular the median part 12 of the slice 4.

However, a part of the reflector 13, in particular near the nearest edge 14 from the mobile housing 5, also reflects the infrared radiation toward the upper or lower part of the slice 4.

In order to standardize the quantity of infrared radiation received on all the surface of the slice 4, it is thus advantageous to prevent a part of the radiation 50 emitted by the resistors (9, 10) from diffusing towards the bread 4. For example, it is advantageous to equip a part of a surface of the reflector 13 with means for preventing the radiation 50 from being reflected towards the bread. In the example represented in FIG. 1, it is advantageous that said means are located near the nearest edge 14 from the mobile housing 5, in order to decrease the quantity of infrared radiation reflected towards the upper and lower parts of the slice 4.

This problem is solved by the invention, whose embodiment is represented in FIG. 2. More precisely, FIG. 2 represents a cavalier projection of a heating element 20, with which is equipped a toaster according to an embodiment of the invention.

According to the example represented in FIG. 2, the heating element 20 comprises a heating resistor 10, inserted in a tube 11 of quartz. According to another embodiment of the invention, a heating element 20 can be a resistor arranged around a cylinder of ceramic material, or a shielded tubular resistor.

The tube 11 is surrounded by a reflector 13, over a sector of 200° approximately. When the element 20 is installed in a toaster 1, a part 21 of the reflector 13 reflects the infrared rays towards the mobile housing 5. This substantially plane part 21 is located near an edge 14 of the reflector 13.

According to the invention, the part 21 of the reflector 13 is equipped with through holes 22, which prevent a part of the infrared radiation of the resistor 10 from being reflected towards the housing 5.

In the example represented in FIG. 2, the holes 22 are arranged in a substantially regular way according to a main axis 23 of the heating element 20. It is also possible to arrange these holes in an irregular way. For example the holes near a center of the edge 14 can be spaced out more than those near the ends (40, 41) of said edge 14. Larger holes can also be provided near the ends (40, 41) than near said center. More radiation 50 can thus be reflected towards a center of the section 4 than towards the side edges of said slice. A central part of the slice 4 is better toasted than the edges, which are in general drier at the beginning.

In the example represented in FIG. 2, the holes 22 are arranged in a substantially regular way on axes (24, 25) substantially parallel to the main axis 23 of the heating element 20. Preferentially, the holes 22 are arranged on at least two axes (24, 25). It is possible to modulate the quantity of reflected radiation by providing holes of different sizes on the axis 24 and the axis 25.

In an advantageous way, in order to homogenize the reflection of the infrared radiation, the holes on an axis 24 are arranged in an alternating way relative to the holes on a contiguous axis 25.

According to an embodiment of the invention, the holes 22 on the same axis 24 or 25 are of similar size and shape, so as to contribute to a homogeneous radiation over the length 26 of the reflector 13.

As previously mentioned, it is also possible to provide holes of variable size and/or shape along the axis 23, in order to generate a variable radiation over the length 26 of the reflector 13.

According to a variant of the invention, it is possible to replace the holes 22 by keys of a non-reflective material, such as paint or varnish. It is also possible to replace the holes 22 by surface zones which have been treated in a particular way, for example frosted zones.

In addition to the regulation effect for the radiation, the presence of holes 22 or keys of paint on the reflectors also has an esthetic effect. With a "mosaic" aspect for the eye of the user, it diverts his attention from possible traces of calcination. These traces would be much more visible on a reflector with a plain surface. This effect is in particular nice in the case of a toaster comprising transparent walls (6, 7).

For elements 20 to be installed in the lower part of a toaster box 2, the presence of holes 22 enables moreover the passage of bread crumbs that have fallen into the reflector 13. These crumbs are thus prevented from being calcined in contact with the tubes 11 of quartz. However, only the crumbs whose dimensions are lower than those of the holes 22 are likely to pass through said holes 22.

FIG. 3 represents a cavalier projection of a heating element 20 according to another embodiment of the invention. This element 20 is similar to that represented in FIG. 2.

In the example represented in FIG. 3, the heating element 20 is equipped with a grid 27, arranged between the tube 11 and the mobile housing 5. This grid 27 primarily consists of wires 28 extending in planes perpendicular to the main axis 23 of the element 20. Each end (29, 30) of each wire 28 is in contact with a part of the reflector 13, or near said reflector 13.

The wires 28 are integrally fixed to at least one wire 31, substantially parallel to the axis 23, which ensures the cohesion of the grid 27.

The wires 28 are bent and surround the tube 11 approximately over a sector of 160°. Thus, in a plane perpendicular to the axis 23, the tube 11 of the element 20 is entirely surrounded by the unit grid 27/reflector 13.

The section, the number and the arrangement of the wires 28 enable to modulate the intensity of the infrared radiation diffused towards the bread by the resistor 10, in a direction parallel to the axis 23. In the same way, the section, the number and the arrangement of the wires 31 enable to modulate the intensity of the radiation diffused towards the bread, in a direction perpendicular to the axis 23.

The wires (28, 31) can also have a variable section over their length.

In a preferential way, the wires (28, 31) are made of metal. They can also be made of another material, having for example a higher absorbance for the infrared radiation.

In addition to its regulation effect for the radiation, the grid 27 enables to prevent big bread crumbs from falling onto the tube 11 and into the reflector 13, as well as these crumbs from being carbonized in contact with the tube 11. More precisely, the bread crumbs whose at least one dimension is larger than a space 32 between two wires 28 can slide on said wires and fall to the bottom of the box 2.

The crumbs whose dimensions are smaller than the space 32 between two wires 28 pass between said wires and fall onto the tube 11 or into the reflector 13. A part of these crumbs can then pass through the holes 22 and fall to the bottom of the box 2.

There is however crumbs of an intermediate size, small enough to go through the grid 27 but too big to pass through the holes 22.

In order to solve this problem, it is possible to replace the grid 27 by a wall, in particular not perforated, made of a material enabling the passage of at least one part of the infrared radiation emitted by the resistor of the element 20. A PTFE or mica wall can particularly be used. Such a wall can have a bent shape, similar to the shape of the grid 27.

The invention claimed is:
1. A toaster comprising:
a thermally insulating box comprising, each opposing side walls of the thermally insulating box comprising two transparent plates and a space being provided between the two transparent plates to form a wall;

a mobile housing for receiving a piece of bread; and at least one heating element utilizing infrared radiation, equipped with at least one means of preventing a part of the infrared radiation from diffusing towards the bread and equipped with a wall comprising one or more perforations, the wall being arranged between said at least one heating element and the mobile housing.

2. The toaster of claim 1, wherein the wall of said at least one heating element comprises a surface having at least one absorbance gradient for the infrared radiation.

3. The toaster of claim 1, wherein the wall of said at least one heating element is made of a transparent or translucent material for transmitting visible light.

4. The toaster of claim 1, wherein the wall of said at least one heating element is a grid.

5. The toaster of claim 1, wherein said at least one heating element comprises a resistor included in a tube of quartz.

6. The toaster of claim 1, wherein said at least one heating element is a resistor arranged around a cylinder of ceramic material.

7. The toaster of claim 1, wherein said at least one heating element is a shielded tubular resistor.

8. The toaster of claim 1, wherein the mobile housing comprises vertical wires arranged side by side, two adjacent wires being spaced with a maximal distance of 19 mm.

9. A toaster comprising:

a thermally insulating box comprising, each opposing side walls of the thermally insulating box comprising two transparent plates and a space being provided between the two transparent plates to form a wall;

a mobile housing for receiving a piece of bread; and at least one heating element comprising a reflector to reflect a portion of infrared radiation towards the bread to be toasted and a part of a surface of the reflector comprising through holes to prevent a part of the infrared radiation from reflecting towards the bread.

10. The toaster of claim 9, wherein said at least one heating element comprises a resistor included in a tube of quartz.

11. The toaster of claim 9, wherein two transparent plates forming a side wall of the thermally insulating box are spaced with a distance of at least 2 mm.

12. The toaster of claim 9, wherein said at least one heating element is a resistor arranged around a cylinder of ceramic material.

13. The toaster of claim 9, wherein said at least one heating element is a shielded tubular resistor.

14. The toaster of claim 9, wherein the mobile housing comprises vertical wires arranged side by side, two adjacent wires being spaced with a maximal distance of 19 mm.

15. A toaster comprising:

a thermally insulating box comprising, each opposing side walls of the thermally insulating box comprising two transparent plates and a space being provided between the two transparent plates to form a wall;

a mobile housing for receiving a piece of bread; and at least one heating element utilizing infrared radiation and equipped with at least one means of preventing a part of the infrared radiation from diffusing towards the bread at least one heating element comprising a reflector to reflect a portion of infrared radiation towards the bread to be toasted and a non-reflective material applied to a part of a surface of the reflector to prevent a part of the infrared radiation from reflecting towards the bread.

16. The toaster of claim 15, wherein said at least one heating element comprises a resistor included in a tube of quartz.

17. The toaster of claim 15, wherein said at least one heating element is a resistor arranged around a cylinder of ceramic material.

18. The toaster of claim 15, wherein said at least one heating element is a shielded tubular resistor.

19. The toaster of claim 15, wherein the mobile housing comprises vertical wires arranged side by side, two adjacent wires being spaced with a maximal distance of 19 mm.

* * * * *